(12) United States Patent
Wasulkar et al.

(10) Patent No.: US 11,616,880 B1
(45) Date of Patent: Mar. 28, 2023

(54) SYSTEM AND METHOD FOR CALCULATING AGENT SKILL SATISFACTION INDEX AND UTILIZATION THEREOF

(71) Applicant: NICE LTD., Ra'anana (IL)

(72) Inventors: Abhijit Wasulkar, Nagpur (IN); Jason Williams, Sandy, UT (US); Mukesh Agarwal, Pune (IN); Priyanka Sutar, Pune (IN)

(73) Assignee: NICE LTD, Ra'anana (IL)

( * ) Notice: Subject to any disclaimer, the term of this patent is extended or adjusted under 35 U.S.C. 154(b) by 0 days.

(21) Appl. No.: 17/679,152

(22) Filed: Feb. 24, 2022

(51) Int. Cl.
*H04M 3/00* (2006.01)
*H04M 3/51* (2006.01)
*G06Q 10/0639* (2023.01)

(52) U.S. Cl.
CPC .... *H04M 3/5175* (2013.01); *G06Q 10/06393* (2013.01); *G06Q 10/06398* (2013.01)

(58) Field of Classification Search
CPC .......... H04M 3/5175; G06Q 10/06393; G06Q 10/06398
See application file for complete search history.

(56) References Cited

U.S. PATENT DOCUMENTS

| | | | |
|---|---|---|---|
| 2021/0112021 A1* | 4/2021 | Rahalkar | G06Q 30/01 |
| 2022/0198364 A1* | 6/2022 | Dhawan | H04M 3/2218 |
| 2022/0253788 A1* | 8/2022 | Hingne | G06Q 10/06398 |

* cited by examiner

*Primary Examiner* — Rasha A Al Aubaidi
(74) *Attorney, Agent, or Firm* — Soroker Agmon Nordman

(57) ABSTRACT

A computerized-method for calculating an agent skill-satisfaction-index and utilization thereof, is provided herein. The computerized-method includes operating an Agent-Skill-Satisfaction-Index (ASSI)-scoring module. The ASSI-scoring module may include: (a) retrieving agent's set-of-skills and call details, during a first-preconfigured-period and one or more agent's interactions conducted during the first-preconfigured-period and related interaction-level (KPI)s; (b) organizing the retrieved one or more agent's interactions in one or more groups by one or more second-preconfigured-periods; (c) checking a duration of each skill from the retrieved set-of-skills if it is assigned to the agent above a preconfigured-period-threshold to be marked as a related-skill; (d) for each group, calculating a skill-core based on a calculated evaluation-sum of each interaction in the group that is associated with a related-skill; (e) calculating an ASSI-score based on the calculated one or more skill scores; and (f) sending the calculated ASSI-score to an application to be presented via a UI thereof.

11 Claims, 13 Drawing Sheets

- Data Point Evaluation = $T_{weight} \times T_{weightvalue}$

| Data Point | Weight | Interaction 1 Value | Interaction 1 Evaluation | Interaction 2 Value | Interaction 2 Evaluation | Interaction 3 Value | Interaction 3 Evaluation | Interaction 4 Value | Interaction 4 Evaluation |
|---|---|---|---|---|---|---|---|---|---|
| Evaluation Score | 5 | 60 | 20 | 50 | 20 | 20 | 10 | 70 | 25 |
| Agent Sentiment | 4 | Neutral | 12 | Good | 20 | Bad | 4 | Good | 20 |
| Customer Sentiment | 3 | Neutral | 9 | Bad | 3 | Bad | 3 | Good | 15 |
| Interaction Duration | 4 | 2 | 20 | 3 | 20 | 0 | 4 | 1 | 20 |
| First Call Resolution | 1 | No | 1 | Yes | 5 | No | 2 | Yes | 5 |
| Evaluation Sum | | | 62 | | 68 | | 22 | | 85 |

Skill Score = (Int1+Int2+Int3+Int4)/No. of Interactions = 59.25

Figure 6B

| Data Point | Data Type | Data Point Weight |
|---|---|---|
| Skill Score | Percentage | 5 |
| No. of working hours | Minutes | 4 |
| Training hours | Minutes | 4 |
| Call Volume | Count | 4 |

| Range | Skill Score | No. of working hours | Training Hours | Call Volume |
|---|---|---|---|---|
| 1 | Less than 1 | Less than 10 | Less than 10 | Less than 10 |
| 2 | 1 to 25 | 10 to 20 | 10 to 20 | 10 to 20 |
| 3 | 26 to 50 | 20 to 30 | 20 to 30 | 20 to 30 |
| 4 | 51 to 75 | 30 to 40 | 30 to 40 | 30 to 40 |
| 5 | 76 to 100 | More than 40 | More than 40 | More than 40 |

- Agent Satisfaction Skill Index (ASSI) =

$$(T_{avgweekscore} - T_{minweekscore}) * (T_{maxweightrange} / T_{maxweekscore}) + T_{minweightrange}$$

| Data Point | Weight | Week 1 Value | Week 1 Evaluation | Week 2 Value | Week 2 Evaluation |
|---|---|---|---|---|---|
| Skill Score | 5 | 60 | 20 | 30 | 15 |
| No of working hours | 4 | 40 | 20 | 20 | 8 |
| Training Hours | 4 | 30 | 14 | 60 | 20 |
| Call Volume | 4 | 20 | 12 | 10 | 8 |
| Evaluation Sum | | | 68 | | 51 |

ASSI = ((60 − 1)* 9/ 84) + 1 = 7.32
ASSI >5 = Agent Satisfied
ASSI <=5 = Agent Not Satisfied

700B

700C

SYSTEM AND METHOD FOR CALCULATING AGENT SKILL SATISFACTION INDEX AND UTILIZATION THEREOF

TECHNICAL FIELD

The present disclosure relates to the field of data analysis for calculating agent skill satisfaction index and utilization thereof for follow-up actions, such as changes to an agent set of skills, training, or coaching.

BACKGROUND

Agents working in a contact center are trained on various skills and domains to handle customer queries. Over a period of time of continuously working with the same set of skills, often agents start losing interest in their job. Researches show that due to the monotonous work and lack of interest in daily work, contact centers have experienced high attrition rates much frequently. The reason may be that answering queries which require the same set of skills becomes monotonous and repetitive for the agents. This may lead to agent absenteeism and even to agent discontent which leads to a search of other opportunities and teaming. This frequent attrition in the contact center bears high costs for contact centers and results in a decrease in customer Net Promoter Score (NPS).

The direct cost of agent turnover is extremely high as the new hiring includes training the agents from start. An agents satisfaction may be difficult to determine and requires a considerable time, effort, and expertise to understand. Studies have also shown that less than 30% of contact centers track agent job satisfaction, as others find it cumbersome and difficult to calculate and track.

Agents who may receive a proactive attention to their current role, such as changes to their set of skills, by training them to acquire a new skill, or coaching them to enhance their knowledge of an existing skill, are more likely to stay at their current company and less likely to leave. This proactive attention may reduce agent churn leading to a significant cost savings and a higher customer NPS.

Contact centers spend a lot of money on staff recruiting and retention. Determining if agents are satisfied with their role, e.g., set of skills and related assignments, may be difficult and time-consuming. Accordingly, there is a need for a technical solution that will provide an automatic calculation of agent skill satisfaction so that the contact center may take proactive measures upon it to retain employees when needed, instead of waiting for year-end satisfaction surveys.

It is an interest of the contact centers to ensure their employees are motivated, enthusiastic and deliver their best every day. Therefore, there is a need for a technical solution that will calculate an agent skill satisfaction index through which the contact center management can proactively identify agents who are showing signs of dissatisfaction, before the agents start looking for another job, and then automatically suggest follow-up actions, e.g., changes to the agent set of skills, training, or coaching. There is a need for a technical solution for calculating an agent skill-satisfaction index and utilization thereof.

SUMMARY

There is thus provided, in accordance with some embodiments of the present disclosure, a computerized-method for calculating an agent skill-satisfaction index and utilization thereof.

Furthermore, in accordance with some embodiments of the present disclosure, in a computerized system that may include one or more processors, an Automated call Distribution (ACD) system, a data store of interactions, and a data store of agents and a memory to store the data stores, the one or more processors may operate every first preconfigured-period, for each agent in the data store of agents, an Agent Skill Satisfaction Index (ASSI) scoring module.

Furthermore, in accordance with some embodiments of the present disclosure, the ASSI scoring module may include: (a) retrieving agent's set of skills and call details, during the first preconfigured-period, from the ACD system; (b) operating an interaction microservice to retrieve one or more agent's interactions which were conducted during the first preconfigured-period and related interaction-level Key Performance Indicators (KPI)s, from the data store of interactions; (c) organizing the retrieved one or more agent's interactions in one or more groups by one or more second preconfigured-periods in the first preconfigured-period; (d) checking a duration of each skill from the retrieved set of skills if it is assigned to the agent above a preconfigured period threshold to mark each skill that is assigned to the agent above the preconfigured period threshold as a related-skill; (e) for each group of the one or more groups calculating a skill score based on a calculated evaluation sum of each interaction in the group that is associated with a related-skill; (f) calculating an ASSI score based on the calculated one or more skill scores of the one or more groups to be stored in the data store of agents; and (g) sending the calculated ASSI score to an application to be presented via a User Interface (UI) thereof.

Furthermore, in accordance with some embodiments of the present disclosure, the one or more agent's interaction-level KPIs may be selected from at least one of: evaluation score, agent sentiments, customer sentiments, interaction duration First Call Resolution (FCR) or any other KPI metric.

Furthermore, in accordance with some embodiments of the present disclosure, when the calculated ASSI is below a preconfigured threshold, the ASSI scoring module may further send a notification to be presented via the UI.

Furthermore, in accordance with some embodiments of the present disclosure, the ASSI scoring module may further provide a suggestion to assign the agent to a training package for a currently assigned skill. When the ASSI is below the preconfigured threshold after the training package has been assigned to the agent, the ASSI scoring module may further send a notification to be presented via the UI and providing a suggestion to assign the new skill to the agent.

Furthermore, in accordance with some embodiments of the present disclosure, when the ASSI is below the preconfigured threshold after a new skill has been assigned to the agent, the ASSI scoring module may further send a notification to be presented via the UI and providing a suggestion to assign a coaching package.

Furthermore, in accordance with some embodiments of the present disclosure, the ASSI scoring module may further operate to retrieve from the data store of agents one or more calculated ASSI scores per the first preconfigured-period for an agent to be presented via the UI of the application as a graph.

Furthermore, in accordance with some embodiments of the present disclosure, the calculated evaluation sum of each interaction may be calculated by formula I:

$$\text{evaluation sum of an interaction} = \text{a weighting factor assigned class to a value of an agent's interaction\_level KPI} \quad \text{(I)}$$

whereby:

a weighted factor is a preconfigured number that indicates the importance of the interaction_level KPI, and an assigned class to a value of an agent's interaction level KPI is a number assigned to a range of values of agent's interaction level KPI.

Furthermore, in accordance with some embodiments of the present disclosure, the calculated skill score may be calculated by formula II:

$$\text{skill score} = \sum_{i=1}^{N} \frac{(\text{evaluation sum of interaction } i)}{N} \quad \text{(II)}$$

whereby:

N is a number of interactions in a group.

Furthermore, in accordance with some embodiments of the present disclosure, the ASSI score may be calculated based on formula III:

$$\text{ASSI score} = ((T_{avgscore} - T_{minscore}) * (T_{maxweightrange})) / T_{maxscore} + T_{minweightrange} \quad \text{(III)}$$

whereby:

$T_{avgscore}$ is an average skill score of the one or more skill scores of the one or more groups, $T_{minscore}$ is a minimum skill score of the one or more skill scores of the one or more groups, $T_{maxweightrange}$ is a maximum value of a weighted factor, $T_{maxscore}$ is a maximum skill score of the one or more skill scores of the one or more groups, and $T_{minweightrange}$ is a minimum value of the weighted factor. The formula may normalize the ASSI score within the range of 1-10.

There is further provided, in accordance with some embodiments of the present disclosure, a computerized-system for calculating an agent skill-satisfaction index and utilization thereof.

Furthermore, in accordance with some embodiments of the present disclosure, the computerized-system may include: one or more processors, an Automated call Distribution (ACD) system, a data store of interactions, and a data store of agents; and a memory to store the data stores. The one or more processors may operate every first preconfigured-period, for each agent in the data store of agents, an Agent Skill Satisfaction Index (ASSI) scoring module. The ASSI scoring module may be configured to: (a) retrieve agent's set of skills and call details, during the first preconfigured-period, from the ACD system; (b) operate an interaction microservice to retrieve one or more agent's interactions which were conducted during the first preconfigured-period and related interaction-level key performance indicator (KPI)s, from the data store of interactions; (c) organize the retrieved one or more agent's interactions in one or more groups by second preconfigured-periods in the first preconfigured-period; (d) check a duration of each skill from the retrieved set of skills if it is assigned to the agent above a preconfigured period threshold to mark each skill that is assigned to the agent above the preconfigured period threshold as related-skill; (e) for each group of the one or more groups calculating a skill score based on a calculated evaluation sum of each interaction is the group that is associated with a related-skill; (f) calculate an ASSI based on the calculated one or more skill scores of the one or more groups to be stored in the data store of agents; and (g) send the calculated ASSI to an application to be presented via a User Interface (UI) thereof.

BRIEF DESCRIPTION OF THE DRAWINGS

FIGS. 6A-6D are examples of KPI data, KPI data evaluation to calculate a skill score and data for ASSI score calculation, in accordance with some embodiments of the present disclosure;

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Agents job satisfaction depends on many factors and most of them are subjective in nature. One of the most crucial factors, is the agent's skill satisfaction. Accordingly, there is a need for a technical solution for increasing agent job satisfaction and decreasing agent absenteeism and agent turnover due to monotonous work, e.g., handling tasks which require the same skill.

Figure 1A:
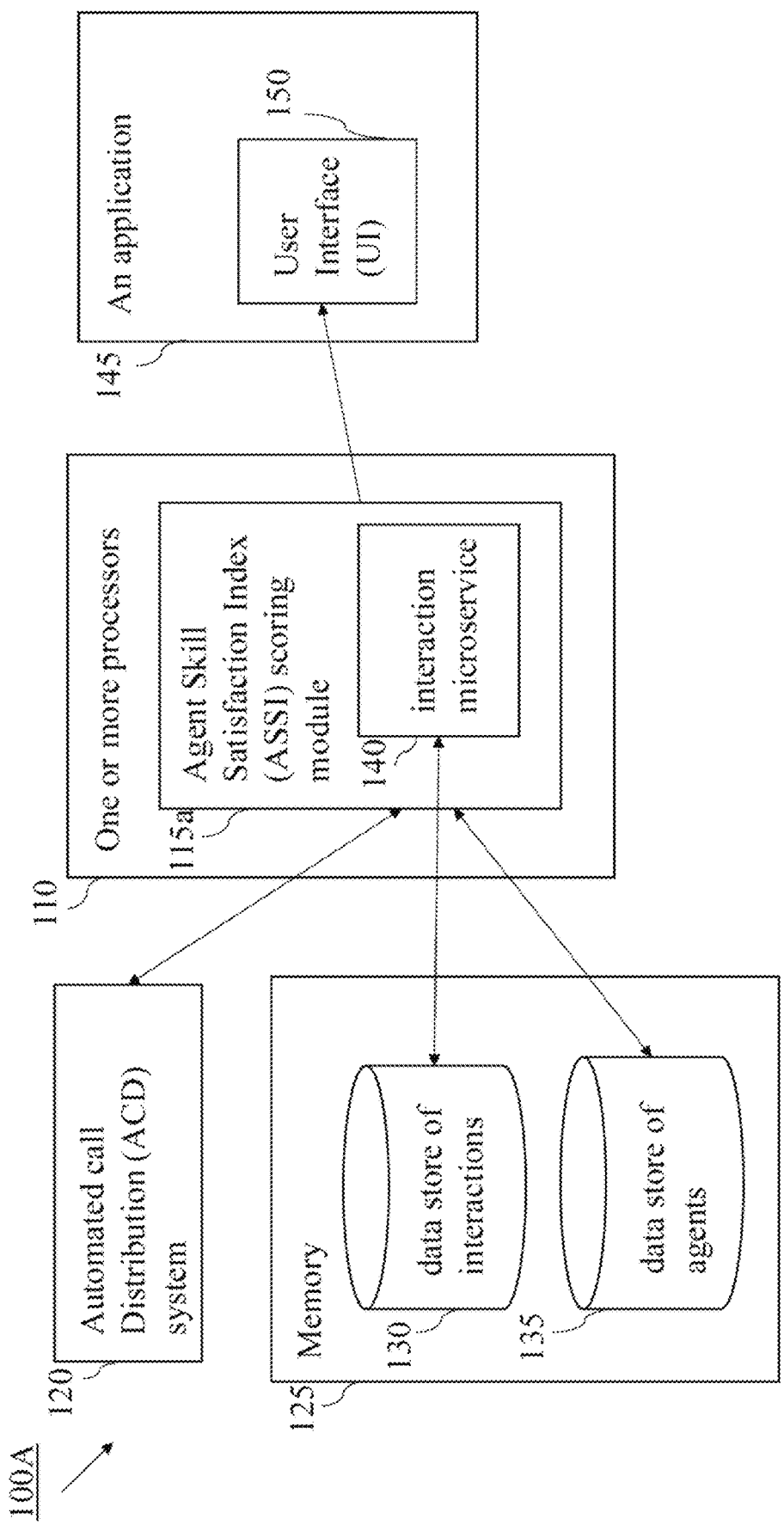
FIGS. 1A-1B schematically illustrate a high-level diagram of a system for calculating an agent skill-satisfaction index and utilization thereof, in accordance with some embodiments of the present disclosure.

FIG. 1A schematically illustrates a high-level diagram of a system 100A for calculating an agent skill-satisfaction index and utilization thereof, in accordance with some embodiments of the present disclosure.

According to some embodiments of the present disclosure, a system, such as system 100A may include one or more processors 110, an Automated call Distribution (ACD) system 120, a data store of interactions 130, and a data store of agents 135; and a memory 125 to store the data stores. The one or more processors 110 may operate every first preconfigured-period, for each agent in the data store of agents 135, a module, such as an Agent Skill Satisfaction Index (ASSI) scoring module 115a and such as ASSI scoring module 200 in FIGS. 2A-2B. The first preconfigured-period may be for example, a month, a year and the like.

According to some embodiments of the present disclosure, in the system 100A a calculation of an Agent Skill Satisfaction Index (ASSI) score may be calculated for each agent for a specified period of time. The ASSI score may indicate how much an agent is satisfied and enjoying the work with currently assigned skill. The ASSI score may provide a contact center management an insight as to the agent skill satisfaction throughout the specified period of time, as opposed to current solution which is commonly deriving the insights from end-year surveys. Moreover, based on the ASSI score and the configured rules, new skills, training, and the like may be automatically assigned to the agent. Consequently, a higher skill satisfaction may lead to a higher job satisfaction, which is linked to customer satisfaction.

According to some embodiments of the present disclosure, the indication provided by the calculated ASSI score may aid the contact center management to proactively identify agents who are showing signs of dissatisfaction, before the agents start looking for another job, thus reducing agents turnover.

According to some embodiments of the present disclosure, the system 100A may automatically suggest changes to a skill mix, training, or even coaching. It is assumed that agents who receive this type of proactive attention to their current role are more likely to stay at their current company for longer and less likely to have high rates of absenteeism. Accordingly, these factors will reduce agents churn leading to significant cost savings and higher NPS from customers.

According to some embodiments of the present disclosure, a module, such as ASSI scoring module 115a may retrieve for each agent in the data store of agents 135, agent's set of skills and call details, during the first preconfigured-period, from the ACD system 120. Call detail may be KPI metrics, such as First Call Resolution (FCR), agent sentiments, customer sentiments, interaction duration and the like.

According to some embodiments of the present disclosure, the ASSI scoring module 115a may further operate a microservice, such as interaction microservice 140 to retrieve one or more agent's interactions which were conducted during the first preconfigured-period and related interaction-level key performance indicator (KPI)s, from a data store, such as the data store of interactions 130 and then organize the retrieved one or more agent's interactions in one or more groups by one or more second preconfigured-periods in the first preconfigured-period. For example, the first preconfigured-period may be a month and the one or more second preconfigured-periods in the first preconfigured-period may be weeks. The one or more agent's interaction-level KPIs may be selected from at least one of: evaluation score, agent sentiments, customer sentiments, interaction duration, First Call Resolution (FCR) or any other KPI metric, as shown in element 310 in FIG. 3.

According to some embodiments of the present disclosure, the ASSI scoring module 115a may check a duration of each skill from the retrieved set of skills if it is assigned to the agent above a preconfigured period threshold to mark each skill that is assigned to the agent above the preconfigured period threshold as a related-skill. For example, the preconfigured period threshold may be a year, so that each skill may be checked if it is assigned to the agent more than a year and marked as a related-skill.

According to some embodiments of the present disclosure, for each group of the one or more groups, e.g., for each second preconfigured-period, such as a week, the ASSI scoring module 115a may calculate a skill score based on a calculated evaluation sum of each interaction in the group that is associated with a related-skill. For example, a skill score may be calculated based on a calculated evaluation sum of each interaction that has been conducted during the week, and the interaction is associated to a related-skill.

Figure 6A:
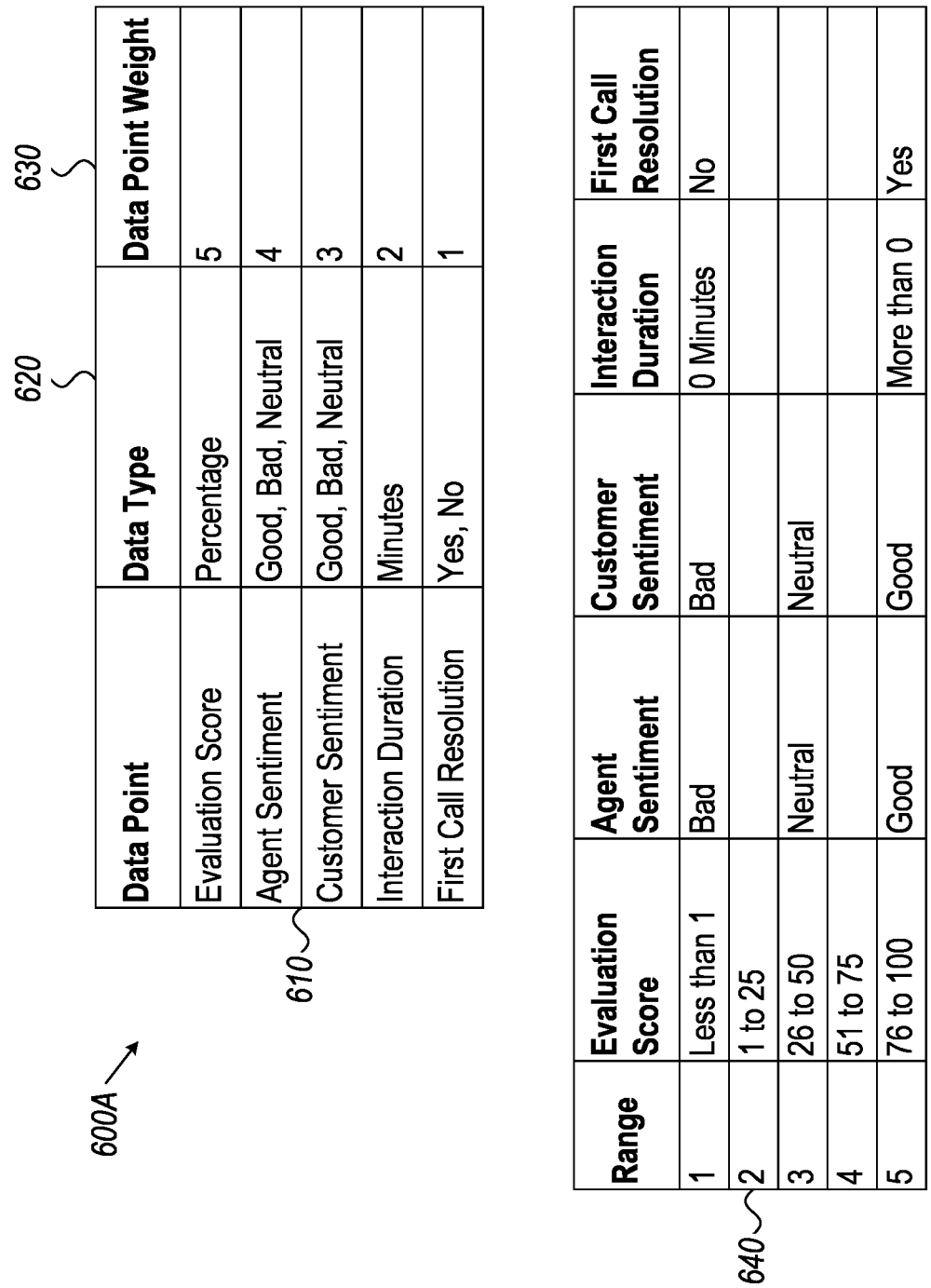

According to some embodiments of the present disclosure, the calculated evaluation sum of each interaction may be calculated by formula I: (I) evaluation sum of an interaction= a weighting factor*assigned class to a value of an agent's interaction_level KPI whereby: a weighted factor is a preconfigured number that indicates the importance of the interaction_level KPI, and an assigned class to a value of an agent's interaction_level KPI is a number assigned to a range of values of agent's interaction_level KPI, as shown, for example, in FIGS. 6A-6B.

Figure 6D:

According to some embodiments of the present disclosure, the ASSI scoring module 115a may calculate an ASSI score based on the calculated one or more skill scores of the one or more groups to be stored in a data store, such as the data store of agents 135. For example, as shown in FIGS. 6C-6D.

According to some embodiments of the present disclosure, the calculated skill score may be calculated by formula II:

$$\text{skill score} = \sum_{i=1}^{N} \frac{(\text{evaluation sum of interaction } i)}{N} \qquad (II)$$

whereby:
N is a number of interactions in a group. A group may be for example, all interactions during a week.

According to some embodiments of the present disclosure, the ASSI score may be calculated based on formula III:
(III) ASSI score=$((T_{avgscore} - T_{minscore}) * (T_{maxweightrange}))/T_{maxscore} + T_{minweightrange}$
whereby:
$T_{avgscore}$ is an average skill score of the one or more skill scores of the one or more groups, for example, when the retrieved one or more agent's interactions may be organized in one or more groups by one or more second preconfigured-periods in the first preconfigured-period, it may be grouped by weeks during a month and $T_{avgscore}$ may be a weekly average of the skill score.

$T_{minscore}$ is a minimum skill score of the one or more skill scores of the one or more groups, for example, a minimum skill score during one of the weeks.

$T_{maxweightrange}$ is a maximum value of a weighted factor, and $T_{maxscore}$ is a maximum skill score of the one or more skill scores of the one or more groups, for example, a maximum skill score during one of the weeks, and $T_{minweightrange}$ is a minimum value of the weighted factor.

According to some embodiments of the present disclosure, the calculated ASSI score may be sent to an application 145 to be presented via a User Interface (UI) 150 thereof or to take a follow-up action upon the ASSI score.

According to some embodiments of the present disclosure, optionally, when the calculated ASSI is below a preconfigured threshold the ASSI scoring module 115a may further send a notification to be presented via the UI 150, as shown in example 700C in FIG. 7C. The notification may be accompanied with a suggestion to assign the agent to a training package for currently assigned skill.

According to some embodiments of the present disclosure, optionally, when the ASSI score is below the preconfigured threshold after the training package has been assigned to the agent, the ASSI scoring module 115a may further send a notification to be presented via the UI 150 and provide a suggestion to assign the new skill to the agent.

According to some embodiments of the present disclosure, optionally, when the ASSI score is below the preconfigured threshold, after a new skill has been assigned to the agent, the ASSI scoring module 115a may further send a notification to be presented via the UI 150 and provide a suggestion to assign a coaching package.

According to some embodiments of the present disclosure, the ASSI scoring module 115a may further retrieve from the data store of agents 135 one or more calculated ASSI scores per the first preconfigured-period for an agent to be presented via the UI 150 of the application 145 as a graph. For example, ASSI scores per month for an agent, as shown in dashboard 700A in FIG. 7A.

According to some embodiments of the present disclosure, the calculated ASSI score may be sent to an application, such as Quality Management (QM) application for a better evaluation of the agents, which may result in an assignment of an improved coaching package to the agent.

Figure 1B:
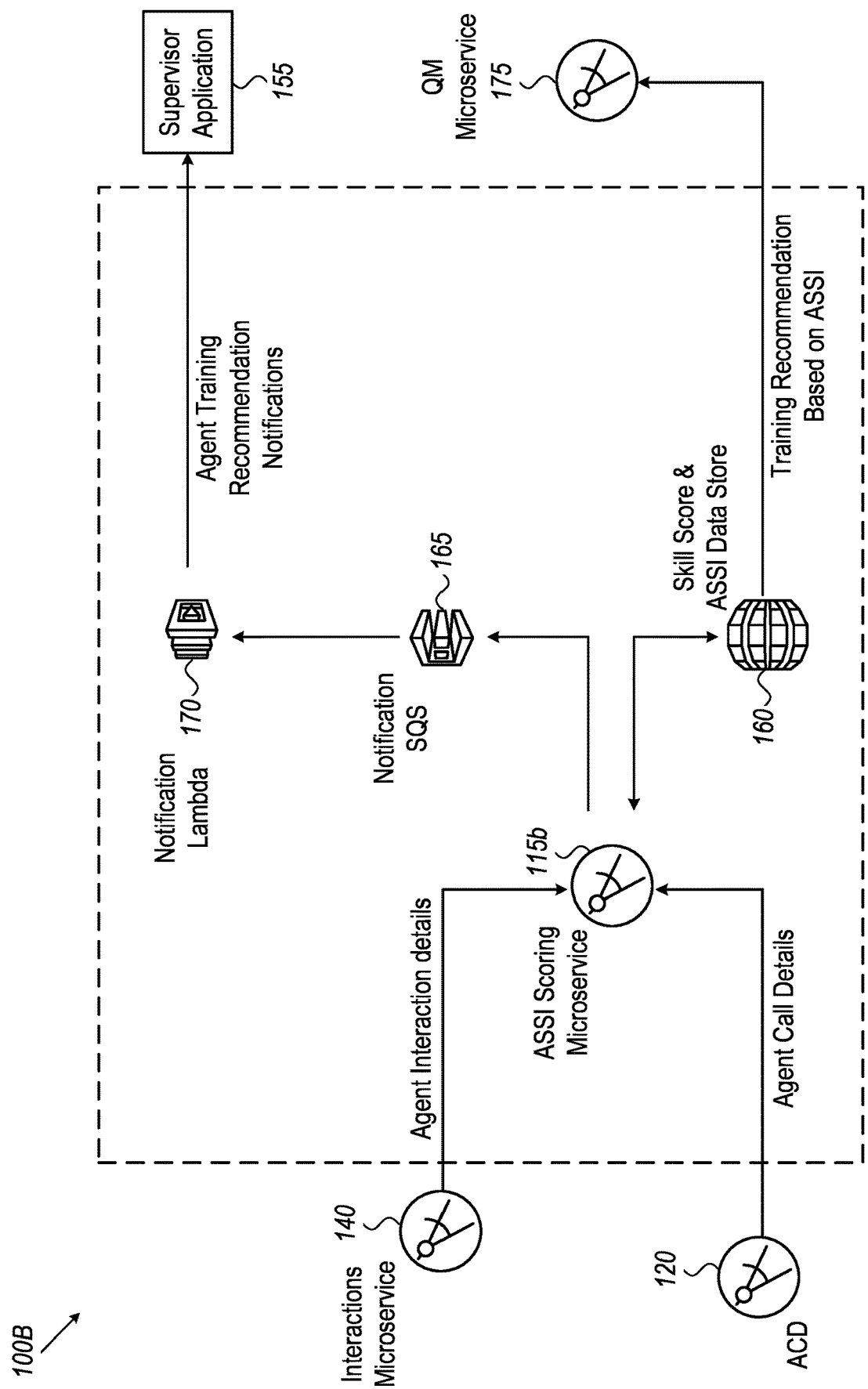

FIG. 1B schematically illustrates a high-level diagram of a system 100B for calculating an agent skill-satisfaction index and utilization thereof, in accordance with some embodiments of the present disclosure.

According to some embodiments of the present disclosure, system 100B may include all the components of system 100A as described above.

According to some embodiments of the present disclosure, the interaction microservice 140 may be implemented by a Java microservice which may operate agents interactions management at skill level. This interaction microservice 140 may handle Create, Read, Update and Delete (CRUD) operations which are related to agents interaction details for various skills as applicable. Furthermore, the interaction microservice 140 may retrieve interaction level KPIs which are required for the ASSI score calculation. The one or more agent's interaction-level KPIs may be at least one of: evaluation score, agent sentiments, customer sentiments, interaction duration. First Call Resolution (FCR) or any other KPI level metric.

According to some embodiments of the present disclosure, the ACD system 120 is a system that automatically routes incoming calls or interactions in a contact center. The ASSI scoring microservice 115b may retrieve agent call details, such as agent's set of skills and call details, during a first preconfigured-period, e.g., a month, from the ACD system 120.

According to some embodiments of the present disclosure, the ASSI scoring module 115a in FIG. 1A may be implemented by a microservice, such as ASSI scoring microservice 115b, which may calculate the ASSI score. On a periodic basis, the ASSI scoring microservice 115b may pull data from the interactions microservice 140 and the ACD system 120 to get a preconfigured list of KPIs and generate a skill score and then an ASSI score for each agent and for each skill of the agent's set of skills.

According to some embodiments of the present disclosure, the ASSI scoring microservice 115b may be a Java microservice deployed on docker containers in a cloud computing platform, such as Amazon Web Services (AWS).

According to some embodiments of the present disclosure, the one or more calculated ASSI scores for each agent may be stored into a data store, such as skill score and ASSI data store 160.

According to some embodiments of the present disclosure, optionally, when the calculated ASSI score is below a preconfigured threshold, the ASSI scoring microservice 115b may further send a notification to be presented via a UI. The ASSI scoring microservice 115b may generate notifications and alerts for a user, such as a supervisor with recommended skill packages asynchronously.

According to some embodiments of the present disclosure, a message queuing service, such as notification Simple Queue Service (SQS) 165 may operate as a message broker to carry messages sent by the ASSI scoring microservice 115b and pass it to a notification lambda 170 for sending actual notifications to the user. The notification lambda 170 may send alerts and notification messages for training packages to the user, for agents that their ASSI score is below a preconfigured threshold and may need a skill upscaling.

According to some embodiments of the present disclosure, an application, such as application 145 in FIG. 1A and such as supervisor application 155, may be used to monitor the activity of the supervisor's team of agents and get all details relate to the team. Based on a calculated ASSI score, skill training recommendations may be sent to the supervisor via this application to be presented via a UI associated therewith. The supervisor may review these recommendations and take appropriate actions.

According to some embodiments of the present disclosure, a Quality Management (QM) microservice 175 may get all QM related data to be displayed on a QM application. An Application Programming Interface (API) may be available in the QM microservice 175 to fetch ASSI details for an agent skill combination as well.

Figure 2A:
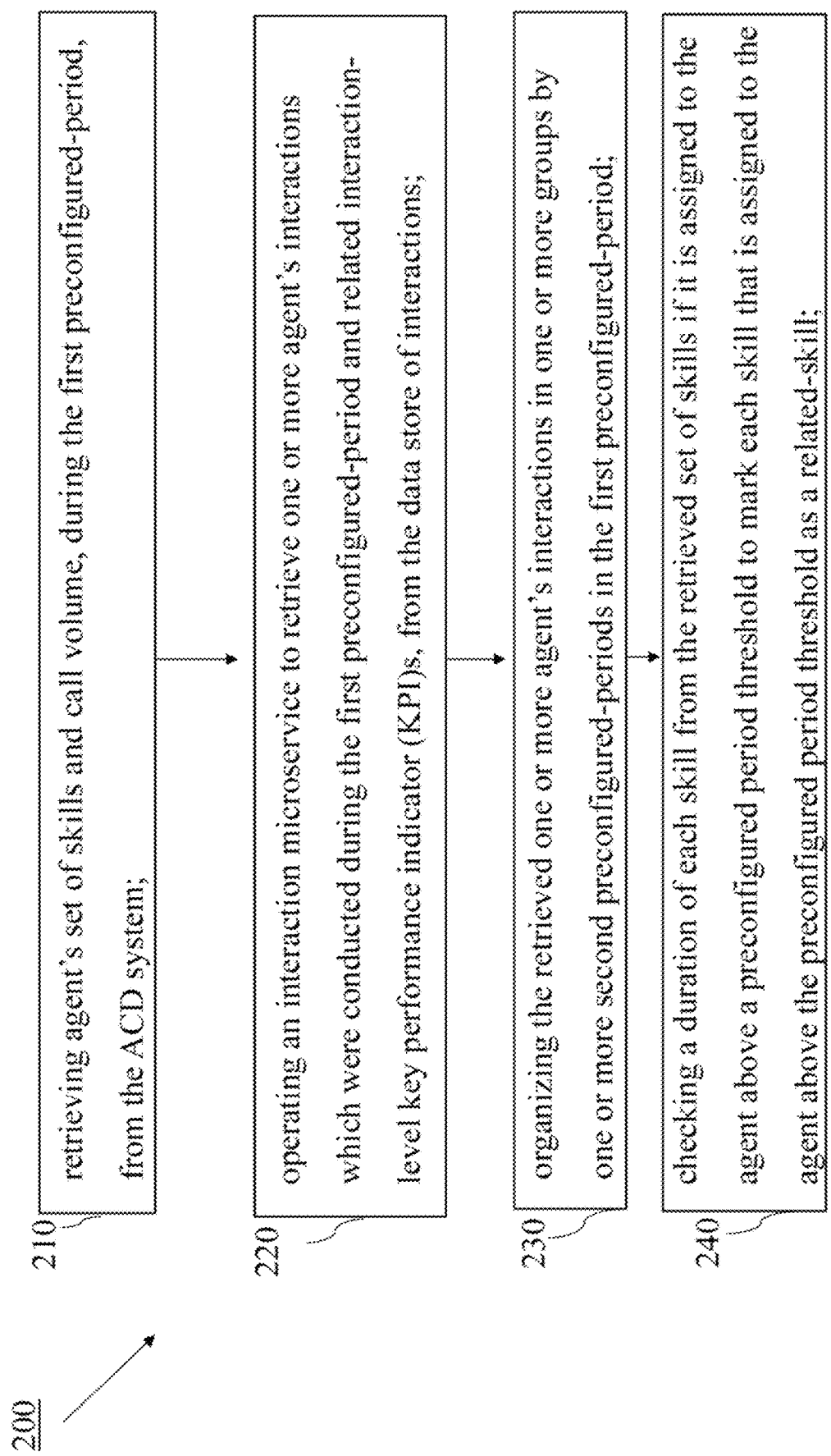
FIGS. 2A-2B are a high-level workflow of an Agent Skill Satisfaction Index (ASSI) scoring module, in accordance with some embodiments of the present disclosure.
Figure 2B:
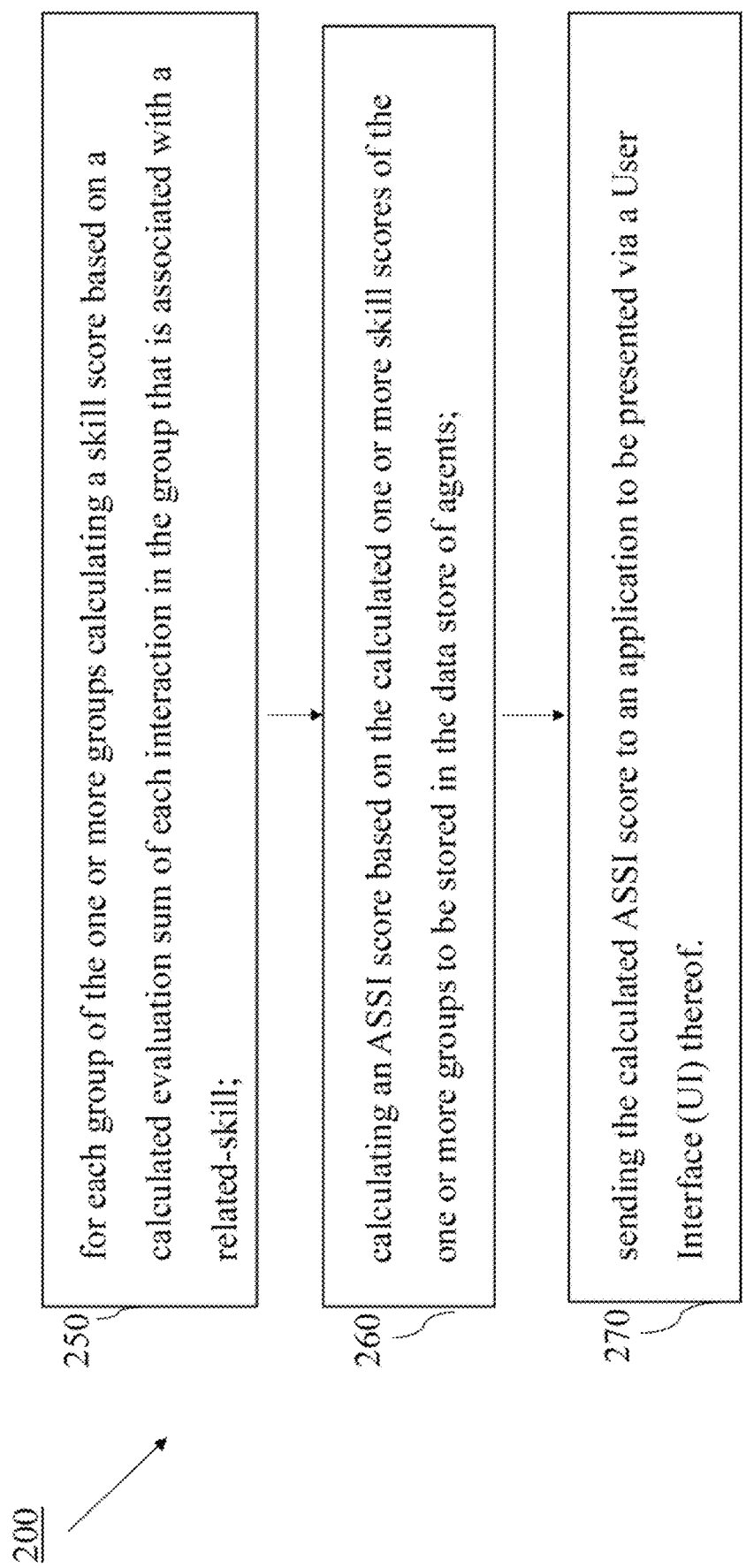

FIGS. 2A-2B are a high-level workflow of an Agent Skill Satisfaction Index (ASSI) scoring module, in accordance with some embodiments of the present disclosure.

According to some embodiments of the present disclosure, operation 210 may comprise retrieving agent's set of skills and call details, during the first preconfigured-period, from the ACD system.

According to some embodiments of the present disclosure, operation 220 may comprise operating an interaction microservice to retrieve one or more agent's interactions which were conducted during the first preconfigured-period and related interaction-level Key Performance Indicator (KPI)s, from the data store of interactions.

According to some embodiments of the present disclosure, operation 230 may comprise organizing the retrieved one or more agent's interactions in one or more groups by one or more second preconfigured-periods in the first preconfigured-period.

According to some embodiments of the present disclosure, operation 240 may comprise checking a duration of each skill from the retrieved set of skills if it is assigned to the agent above a preconfigured period threshold to mark each skill that is assigned to the agent above the preconfigured period threshold as a related-skill.

According to some embodiments of the present disclosure, operation 250 may comprise for each group of the one or more groups calculating a skill score based on a calculated evaluation sum of each interaction in the group that is associated with a related-skill.

According to some embodiments of the present disclosure, operation 260 may comprise calculating an ASSI score based on the calculated one or more skill scores of the one or more groups to be stored in the data store of agents.

According to some embodiments of the present disclosure, operation 270 may comprise sending the calculated ASSI score to an application to be presented via a User Interface (UI) thereof.

Figure 3:
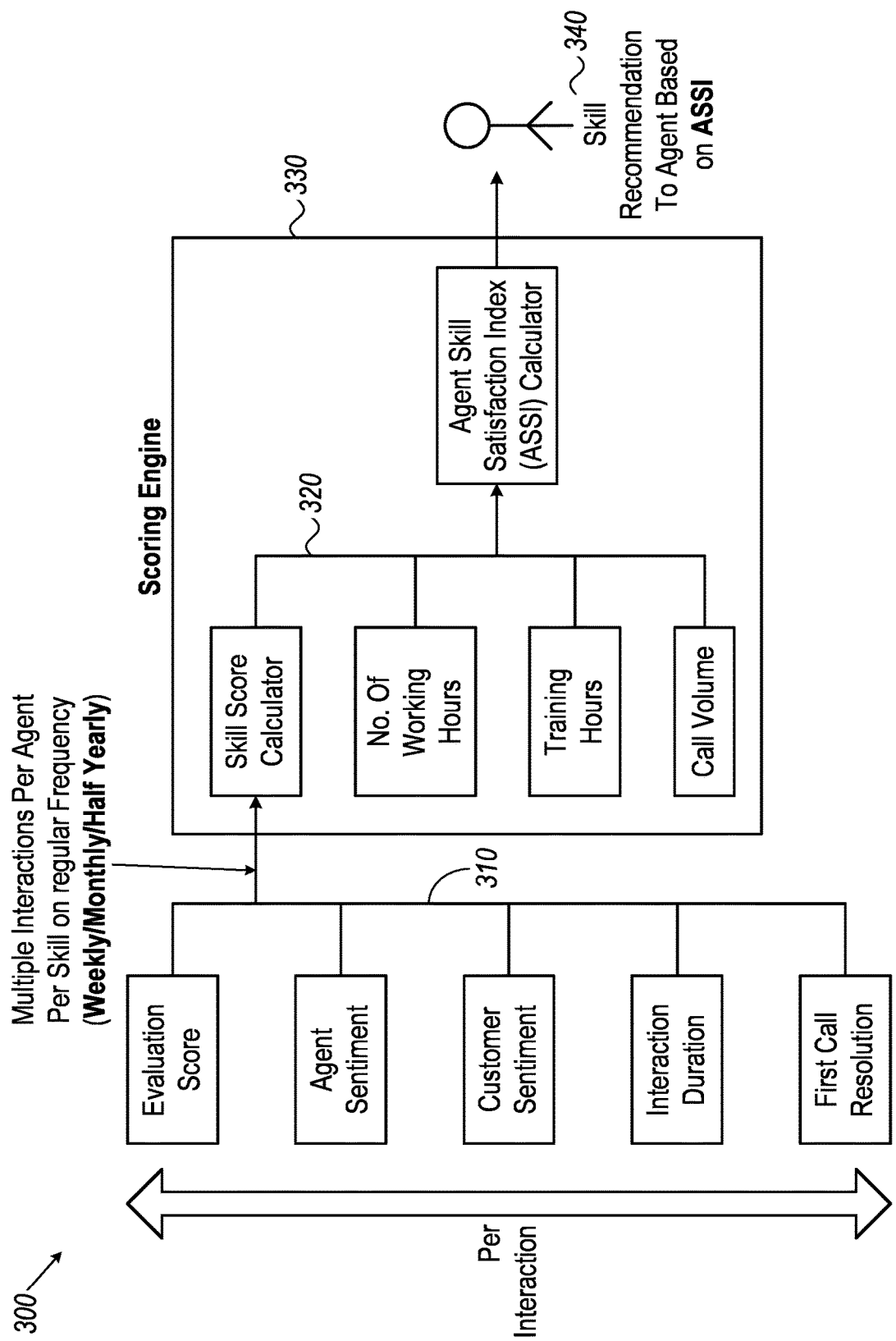
FIG. 3 schematically illustrates a high-level diagram of an Agent Skill Satisfaction Index (ASSI) scoring module based on agent interactions and other metrices, in accordance with some embodiments of the present disclosure.

FIG. 3 schematically illustrates a high-level diagram of an Agent Skill Satisfaction Index (ASSI) scoring module 300 based on agent interactions and other metrices, in accordance with some embodiments of the present disclosure.

According to some embodiments of the present disclosure, system 100A in FIG. 1A may operate a module such as ASSI scoring module 115a in FIG. 1A or such as scoring engine 330 to calculate an ASSI score.

According to some embodiments of the present disclosure, agent's interactions details during a first pre-configured-period, such as evaluation score, agent sentiment, customer sentiment, interaction duration First Call Resolution (FCR) 310, may be retrieved for each agent.

According to some embodiments of the present disclosure, other agent's non-interaction level metrics may be also retrieved, such as skill score, number of working hours, training hours, call details and the like 320.

Figure 7A:
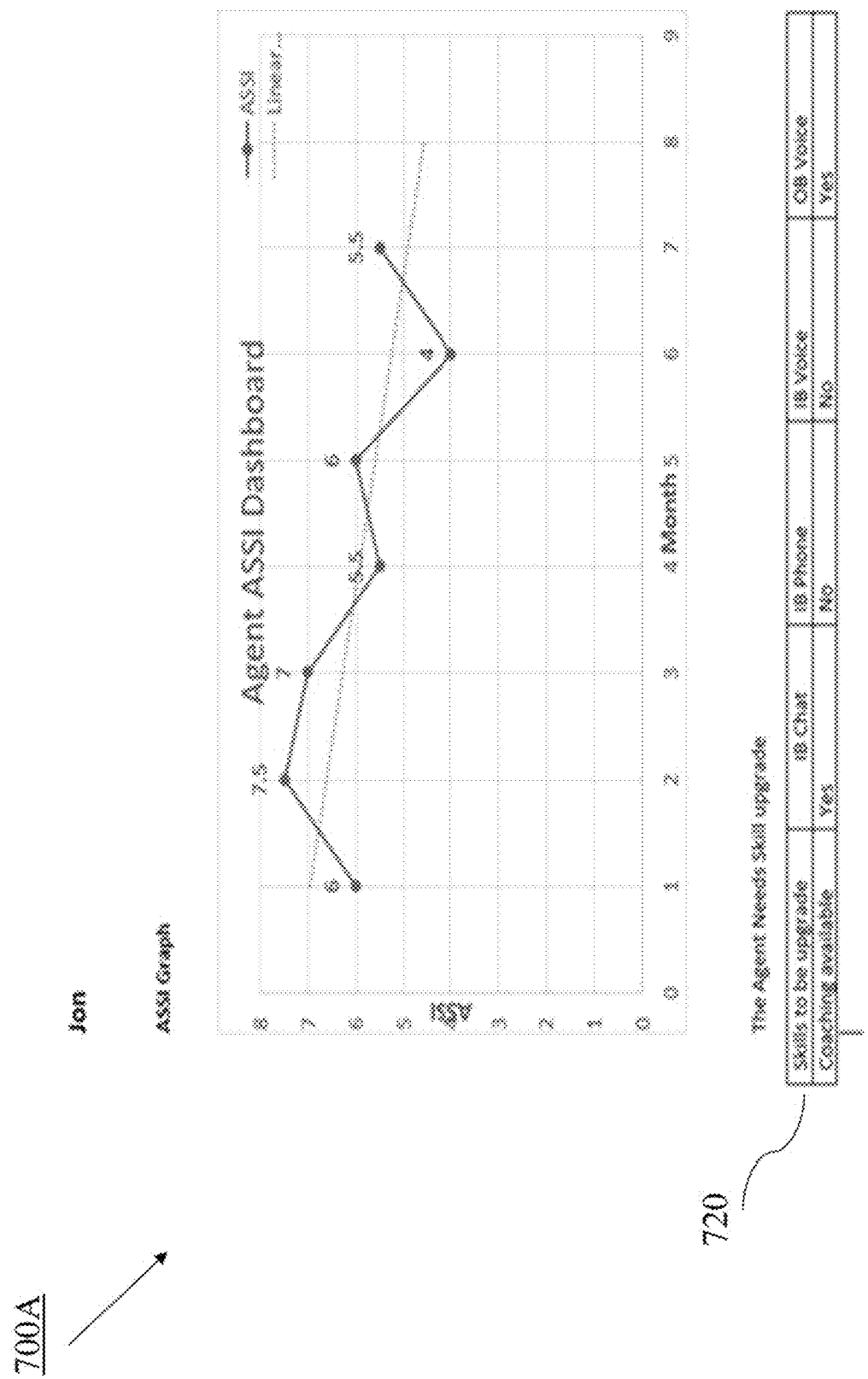
FIGS. 7A-7B are examples of an agent ASSI presented via a dashboard or a User Interface (UI), in accordance with some embodiments of the present disclosure.

According to some embodiments of the present disclosure, based on the calculated ASSI score skill recommendation to agent may be provided 340, as shown in table 720 in FIG. 7A that the agent requires a skill upgrade all four skills, i.e., inbound chat, inbound phone, inbound voice and outbound voice.

Figure 4:
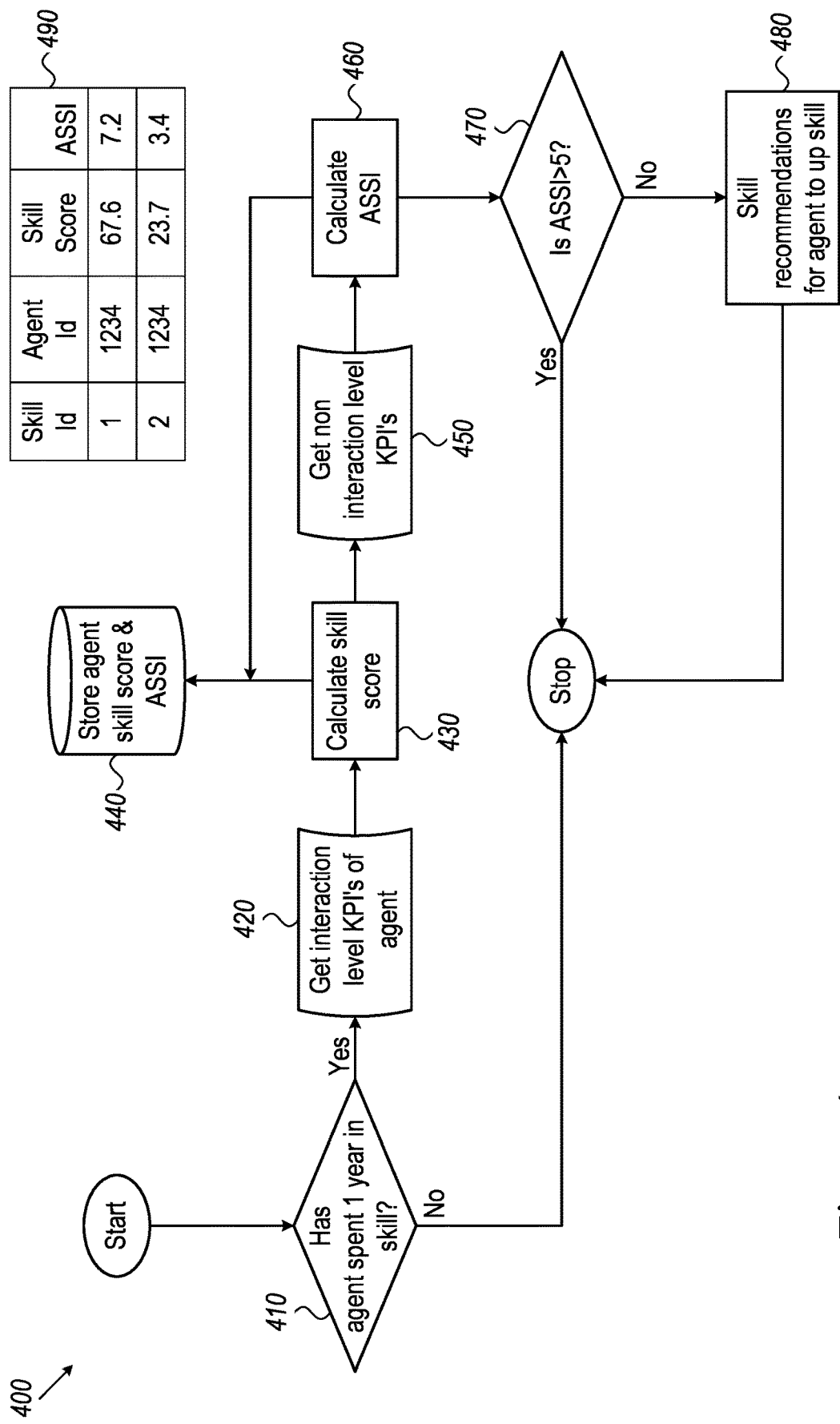
FIG. 4 is a flow diagram of an Agent Skill Satisfaction Index (ASSI) calculation and skill recommendation, in accordance with some embodiments of the present disclosure.

FIG. 4 is a flow diagram 400 of an Agent Skill Satisfaction Index (ASSI) calculation and skill recommendation, in accordance with some embodiments of the present disclosure.

According to some embodiments of the present disclosure, each agent's skill may be checked if it is assigned to the agent above a preconfigured period threshold to be marked as a related-skill, in a non-limiting example, the preconfigured period threshold may be a year.

According to some embodiments of the present disclosure, interaction level KPIs of each agent may be retrieved 420 and based on it a skill score may be calculated 430 to be stored in a data store, such as agent skill score and ASSI 440.

According to some embodiments of the present disclosure, non-interaction level KPIs may be retrieved 450. For example, training hours, call volume and working hours.

According to some embodiments of the present disclosure, based on the calculated skill score and non-interaction level KPIs an ASSI may be calculated 460.

According to some embodiments of the present disclosure, for example for an agent 490 in a data store of agents, such as agent '1234', for skill '1' a skill score 67.6 may be calculated and for skill '2' a skill score 23.7 may be calculated. For each skill an ASSI score may be calculated, e.g., for skill '1' ASSI score may be 7.2 and for skill '2' an ASSI score 3.4 may be calculated.

According to some embodiments of the present disclosure, when the ASSI score is not more than a preconfigured value, e.g. '5' then a skill recommendation for the agent may be sent to an application to upscale the skill 480. For example, skill '2' of agent '1234' which has been calculated a ASSI score of 3.4 may require a follow-up action such as training or a coaching package.

Figure 5:
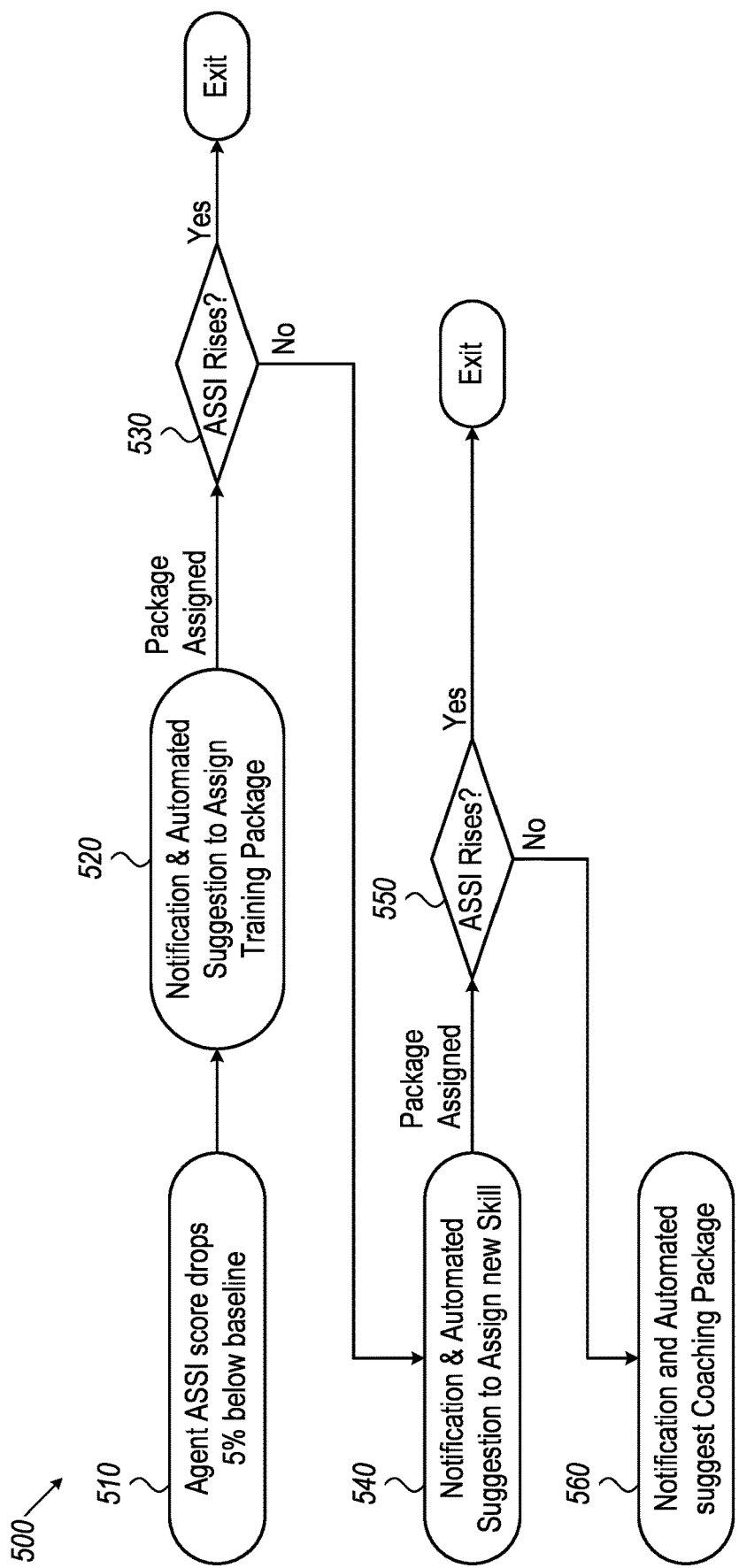
FIG. 5 is a flow diagram of rules application based on an ASSI score for skill recommendation, in accordance with some embodiments of the present disclosure.

FIG. 5 is a flow diagram 500 of rules application based on an ASSI score for skill recommendation, in accordance with some embodiments of the present disclosure.

According to some embodiments of the present disclosure, when an agent ASSI score drops a preconfigured percentage e.g., 5% below a baseline 510 a notification and an automated suggestion to assign a training package to an agent 520 may be sent to a user, such as a supervisor.

According to some embodiments of the present disclosure, after a training package has been assigned to the agent, checking of the ASSI score has been rose 530.

According to some embodiments of the present disclosure, when the ASSI score hasn't been risen after the package has been assigned a notification and an automated suggestion to assign a new skill to the agent 540 may be sent to the user.

According to some embodiments of the present disclosure, when the ASSI score hasn't been risen after the new skill has been assigned a notification and an automated suggestion to assign a coaching package 560 may be sent to the user.

FIGS. 6A-6D are an example of KPI data, KPI data evaluation to calculate a skill score and data for ASSI score calculation, in accordance with some embodiments of the present disclosure.

According to some embodiments of the present disclosure, the calculated evaluation sum of each interaction may be calculated by formula I:

$$\text{evaluation sum of an interaction} = \text{a weighting factor} * \text{assigned class to a value of an agent's interaction\_level KPI} \qquad (I)$$

whereby:
a weighted factor is a preconfigured number that indicates the importance of the interaction_level KPI, and an assigned class to a value of an agent's interaction_level KPI is a number assigned to a range of values of agent's interaction_level KPI.

According to some embodiments of the present disclosure, table 600A shows an example of one or more agent's interaction-level KPIs, its data type 620 weightage 630 of each interaction-level KPI and an assigned class to a value of an agent's interaction_level KPI 640.

According to some embodiments of the present disclosure, table 600B shows an example of data for skill score calculation of four interactions of an agent. For example, one or more groups by one or more second preconfigured-periods in a first preconfigured-period may be one or more weeks during a month.

According to some embodiments of the present disclosure, the calculated skill score is calculated by formula II:

$$\text{skill score} = \sum_{i=1}^{N} \frac{(\text{evaluation sum of interaction } i)}{N} \quad \text{(II)}$$

whereby: N is a number of interactions in a group. For example, a group may be all interaction that were conducted during a week.

According to some embodiments of the present disclosure, table 600C shows an example of metrics for a calculation of ASSI score.

According to some embodiments of the present disclosure, working hours, training hours, call volume and skill score may be metrics for the calculation of ASSI score. The skill score may be calculated based on interaction level KPIs for each period and then the ASSI score may be calculated for example, based on the working hours, training hours, call volume and skill score.

table 600D shows an example of a calculation of the ASSI score based on formula III:

$$\text{ASSI score} = ((T_{avgscore} - T_{minscore}) * (T_{maxweightrange}))/T_{maxscore} + T_{minweightrange} \quad \text{(III)}$$

whereby:

$T_{avgscore}$ is an average skill score of the one or more skill scores of the one or more groups, $T_{minscore}$ is a minimum skill score of the one or more skill scores of the one or more groups, $T_{maxweightrange}$ is a maximum value of a weighted factor, $T_{maxscore}$ is a maximum skill score of the one or more skill scores of the one or more groups, and $T_{minweightrange}$ is a minimum value of the weighted factor.

The formula may normalize the ASSI score within the range of 1-10.

For example, when the average periodic score, e.g., for two weeks, i.e., $T_{avgscore}=60$, i.e. ((68+51)/2), when the maximum of the average value may reach up to '85' and the maximum of the average value may be 1, the average periodic score may be divided by 85−1=84. Thus, the average score may be converted into a range of 1-10 after the calculation for the range of 1-85. Therefore, when the, minimum range, i.e., $T_{minweightrange}=1$ and the maximum range is 10 then the maximum weight range is $T_{maxweightrange}=10-1=9$. The Final ASSI score=((60−1)*9)/84+1=7.32.

Figure 7B:
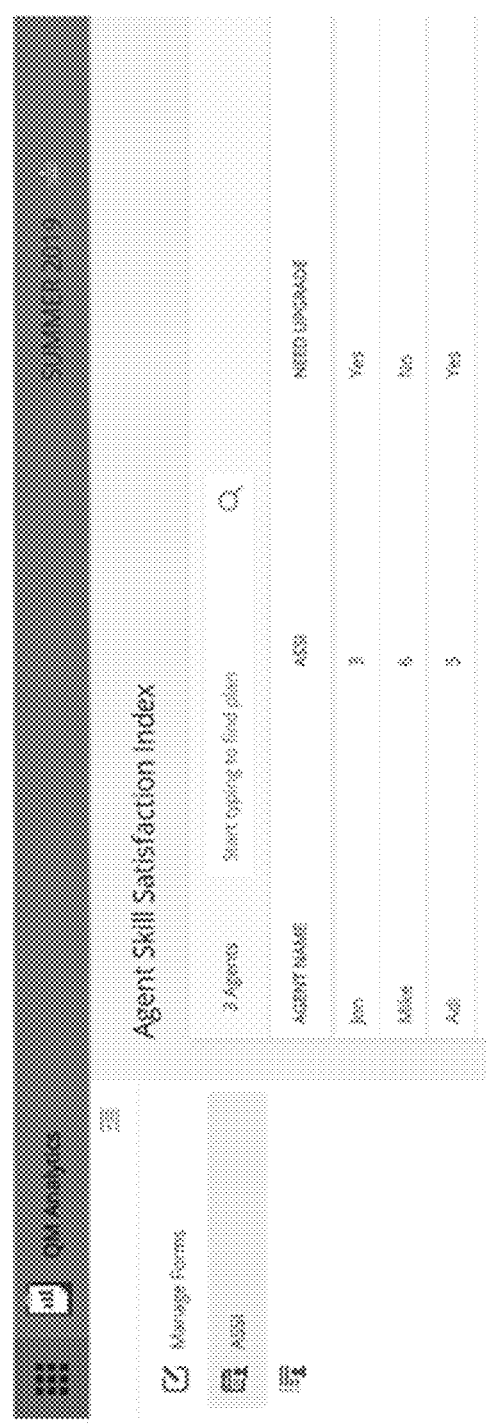
Figure 7C:
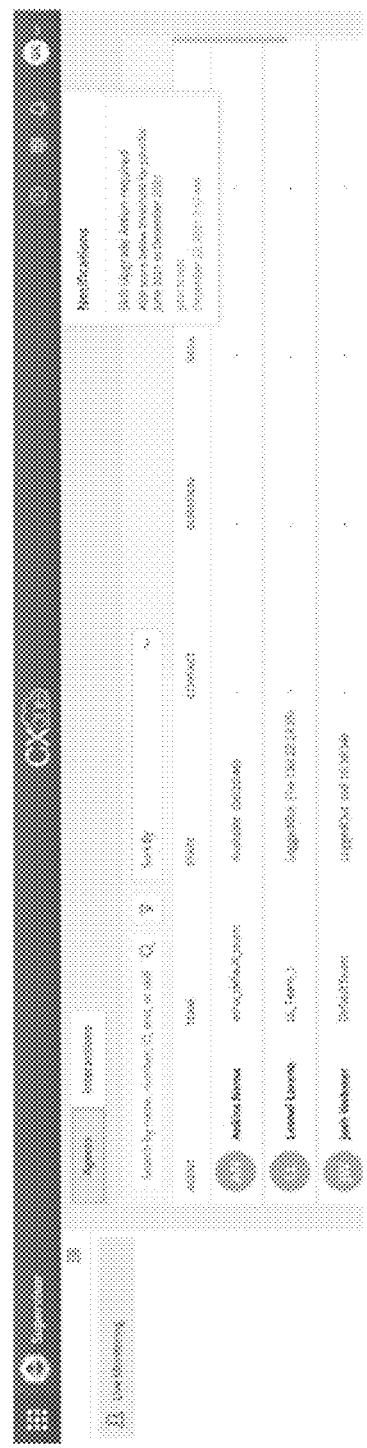
FIG. 7C is an example of a notification presented via a dashboard or a UI, when a calculated ASSI is below a preconfigured threshold, in accordance with some embodiments of the present disclosure.

FIGS. 7A-7B are examples of an agent ASSI presented via a dashboard 700A or User Interface (UI) 700B, in accordance with some embodiments of the present disclosure.

According to some embodiments of the present disclosure, a calculated ASSI score for an agent for each month may be presented via a dashboard, such as dashboard 700A. The trend shown via dashboard 700A has a linear decrease, which may signify that the agent is not satisfied with the currently assigned skill. Optionally, if the graph is in a decreasing trend the system may display other skills on which the agent can be trained.

According to some embodiments of the present disclosure, skills training information, i.e., if coaching for the skill is available or not may be also shown. As per the suggestion the user may then assign new skill trainings to the agent and then monitor the ASSI score for it.

According to some embodiments of the present disclosure, the ASSI score may be integrated as part of an application, such as Quality Management (QM) application, where a user, such as a supervisor may view an ASSI score of each agent, as shown in table 700B.

According to some embodiments of the present disclosure, depending on the ASSI score and configuration it may also show if the agent needs a skill upgrade. When the user clicks on an agent, it may also show a detailed graph of the agent ASSI score over a period as in table 700A.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for calculating an agent skill-satisfaction index and utilization thereof, the computerized-method comprising:

in a computerized system comprising one or more processors, an Automated call Distribution (ACD) system, a data store of interactions, and a data store of agents; and a memory to store the data stores, said one or more processors are operating every first preconfigured-period, for each agent in the data store of agents, an Agent Skill Satisfaction Index (ASSI) scoring module, said ASSI scoring module comprising:

(a) retrieving agent's set of skills and call details, during the first preconfigured-period, from the ACD system;

(b) operating an interaction microservice to retrieve one or more agent's interactions which were conducted during the first preconfigured-period and related interaction-level key performance indicator (KPI)s, from the data store of interactions;

(c) organizing the retrieved one or more agent's interactions in one or more groups by one or more second preconfigured-periods in the first preconfigured-period;

(d) checking a duration of each skill from the retrieved set of skills if it is assigned to the agent above a preconfigured period threshold to mark each skill that is assigned to the agent above the preconfigured period threshold as a related-skill;

(e) for each group of the one or more groups calculating a skill score based on a calculated evaluation sum of each interaction in the group that is associated with a related-skill;

(f) calculating an ASSI score based on the calculated one or more skill scores of the one or more groups to be stored in the data store of agents; and (g) sending the calculated ASSI score to an application to be presented via a User Interface (UI) thereof.

2. The computerized-method of claim 1, wherein the one or more agent's interaction-level KPIs are selected from at least one of: evaluation score, agent sentiments, customer sentiments, interaction duration, First Call Resolution (FCR) or any other KPI metric.

3. The computerized-method of claim 1, wherein when the calculated ASSI score is below a preconfigured threshold the ASSI scoring module is further sending a notification to be presented via the UI.

4. The computerized-method of claim 3, wherein the ASSI scoring module is further providing a suggestion to assign the agent to a training package for currently assigned skill.

5. The computerized-method of claim 4, wherein when the ASSI score is below the preconfigured threshold after the training package has been assigned to the agent the ASSI scoring module is further sending a notification to be presented via the UI and providing a suggestion to assign the new skill to the agent.

6. The computerized-method of claim 5, wherein when the ASSI is below the preconfigured threshold after a new skill has been assigned to the agent, the ASSI scoring module is further sending a notification to be presented via the UI and providing a suggestion to assign a coaching package.

7. The computerized-method of claim 1, wherein the ASSI scoring module is further operated to retrieve from the data store of agents one or more calculated ASSI scores per the first preconfigured-period for an agent to be presented via the UI of the application as a graph.

8. The computerized-method of claim 1, wherein the calculated evaluation sum of each interaction is calculated by formula I:

$$\text{evaluation sum of an interaction} = \text{a weighting factor} * \text{assigned class to a value of an agent's interaction\_level KPI} \qquad (I)$$

whereby:
a weighted factor is a preconfigured number that indicates the importance of the interaction_level KPI, and
an assigned class to a value of an agent's interaction_level KPI is a number assigned to a range of values of agent's interaction_level KPI.

9. The computerized-method of claim 8, wherein the calculated skill score is calculated by formula II:

$$\text{skill score} = \sum_{i=1}^{N} \frac{(\text{evaluation sum of interaction } i)}{N} \qquad (II)$$

whereby:
N Is a number of Interactions in a group.

10. The computerized-method of claim 1, wherein the ASSI score is calculated based on formula III:

$$\text{ASSI score} = ((T_{avgscore} - T_{minscore}) * (T_{maxweightrange})) / T_{maxscore} + T_{minweightrange} \qquad (IV)$$

whereby:
$T_{avgscore}$ is an average skill score of the one or more skill scores of the one or more groups,
$T_{minscore}$ is a minimum skill score of the one or more skill scores of the one or more groups,
$T_{maxweightrange}$ is a maximum value of a weighted factor
$T_{maxscore}$ is a maximum skill score of the one or more skill scores of the one or more groups, and
$T_{minweightrange}$ is a minimum value of the weighted factor.

11. A computerized-system for calculating an agent skill-satisfaction index and utilization thereof, the computerized-system comprising:
one or more processors,
an Automated call Distribution (ACD) system,
a data store of interactions, and a data store of agents; and
a memory to store the data stores,
said one or more processors are operating every first preconfigured-period, for each agent in the data store of agents, an Agent Skill Satisfaction Index (ASSI) scoring module, said ASSI scoring module is configured to:
(a) retrieve agent's set of skills and call details, during the first preconfigured-period, from the ACD system;
(b) operate an interaction microservice to retrieve one or more agent's interactions which were conducted during the first preconfigured-period and related interaction-level key performance indicator (KPI)s, from the data store of interactions;
(c) organize the retrieved one or more agent's interactions in one or more groups by second preconfigured-periods in the first preconfigured-period;
(d) check a duration of each skill from the retrieved set of skills if it is assigned to the agent above a preconfigured period threshold to mark each skill that is assigned to the agent above the preconfigured period threshold as related-skill;
(e) for each group of the one or more groups calculating a skill score based on a calculated evaluation sum of each interaction is the group that is associated with a related-skill;
(f) calculate an ASSI based on the calculated one or more skill scores of the one or more groups to be stored in the data store of agents; and
(g) send the calculated ASSI to an application to be presented via a User Interface thereof.

* * * * *